US010409533B2

(12) United States Patent
Ikazaki et al.

(10) Patent No.: US 10,409,533 B2
(45) Date of Patent: Sep. 10, 2019

(54) IMAGE FORMING APPARATUS WITH AN IMPROVED MEMORY MANAGEMENT SYSTEM

(71) Applicant: KYOCERA Document Solutions Inc., Osaka (JP)

(72) Inventors: Akihiko Ikazaki, Osaka (JP); Kyoichiro Hayashi, Osaka (JP); Shuntaro Tsuji, Osaka (JP); Masato Tanba, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/973,149

(22) Filed: May 7, 2018

(65) Prior Publication Data
US 2018/0329654 A1 Nov. 15, 2018

(30) Foreign Application Priority Data

May 9, 2017 (JP) ................... 2017-093301

(51) Int. Cl.
G06F 3/12 (2006.01)
H04N 1/00 (2006.01)
G06K 15/02 (2006.01)

(52) U.S. Cl.
CPC ............ *G06F 3/122* (2013.01); *G06F 3/1208* (2013.01); *G06F 3/1213* (2013.01); *G06F 3/1229* (2013.01); *G06F 3/1247* (2013.01); *G06F 3/1285* (2013.01); *H04N 1/0009* (2013.01); *G06K 15/1836* (2013.01)

(58) Field of Classification Search
CPC ...... G06F 3/122; G06F 3/1213; G06F 3/1285; G06F 3/1247; G06F 3/1208; G06F 3/1229; H04N 1/0009
USPC ..................... 358/1.14, 1.15, 1.18
See application file for complete search history.

(56) References Cited

U.S. PATENT DOCUMENTS

2003/0234952 A1* 12/2003 Abe ................. G06F 3/122 358/1.16
2008/0002227 A1* 1/2008 Tsujimoto ............ B41J 3/60 358/1.18
2016/0085486 A1* 3/2016 Yokozawa ........... G06F 3/1212 358/1.13

FOREIGN PATENT DOCUMENTS

JP 2009-055457 3/2009

* cited by examiner

*Primary Examiner* — Benny Q Tieu
*Assistant Examiner* — Juan M Guillermety

(57) ABSTRACT

An image forming apparatus includes a main memory device, an auxiliary storage device, a print request receiving unit, and a print processing unit. The print request receiving unit is configured to (a) receive from an external device a print request that includes the number of printing pages and print image data, (b) select one of the main memory device and the auxiliary storage device as a device to which the print image data is to be written on the basis of the number of printing pages, and (c) write the print image data in the selected main memory device or auxiliary storage device. The print processing unit is configured to read the print image data from the main memory device or the auxiliary storage device and perform a print process based on the print image data.

6 Claims, 2 Drawing Sheets derance of the present disclosure will become more apparent upon reading
IMAGE FORMING APPARATUS WITH AN IMPROVED MEMORY MANAGEMENT SYSTEM

CROSS-REFERENCE TO RELATED APPLICATIONS

This application relates to and claims priority rights from Japanese Patent Application No. 2017-093301, filed on May 9, 2017, the entire disclosures of which are hereby incorporated by reference herein.

BACKGROUND

1. Field of the Present Disclosure

The present disclosure relates to an image forming apparatus.

2. Description of the Related Art

An image forming apparatus refers to a data size of image data and thereby if an area sufficient to write the image data can be found in a RAM (Random Access Memory), then the image forming apparatus writes the image data in the RAM, and if an area sufficient to write the image data can not be found in the RAM, then the image forming apparatus writes the image data in a storage device.

However, until the end of the image data is determined and the size of the whole image data is determined, the aforementioned image forming apparatus hardly determines whether the image forming apparatus should write the image in the RAM or in the storage device.

For example, when the image forming apparatus receives a print request from an external device such as a host device and the print request includes print image data, the image forming apparatus can not determine which the image forming apparatus should write the print image data, in the RAM or in the storage device, until the whole of the print image data is received. Therefore, in such a case, the print image data is always written in the storage device.

In general, read/write speeds of a storage device are lower than ones of a RAM, and therefore the print image data was written in the storage device although an area sufficient to write the print image data can be found in the RAM, and consequently a print process based on the print image data is delayed in comparison with writing it in the RAM. Further, if the storage device is an SSD (Solid State Drive) or the like using a NAND flash memory, then the number of writing times increases and consequently deterioration of the storage device is accelerated.

SUMMARY

An image forming apparatus according to an aspect of the present disclosure includes a main memory device, an auxiliary storage device, a print request receiving unit, and a print processing unit. The print request receiving unit is configured to (a) receive from an external device a print request that includes the number of printing pages and print image data, (b) select one of the main memory device and the auxiliary storage device as a device to which the print image data is to be written on the basis of the number of printing pages, and (c) write the print image data in the selected main memory device or auxiliary storage device. The print processing unit is configured to read the print image data from the main memory device or the auxiliary storage device and perform a print process based on the print image data.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
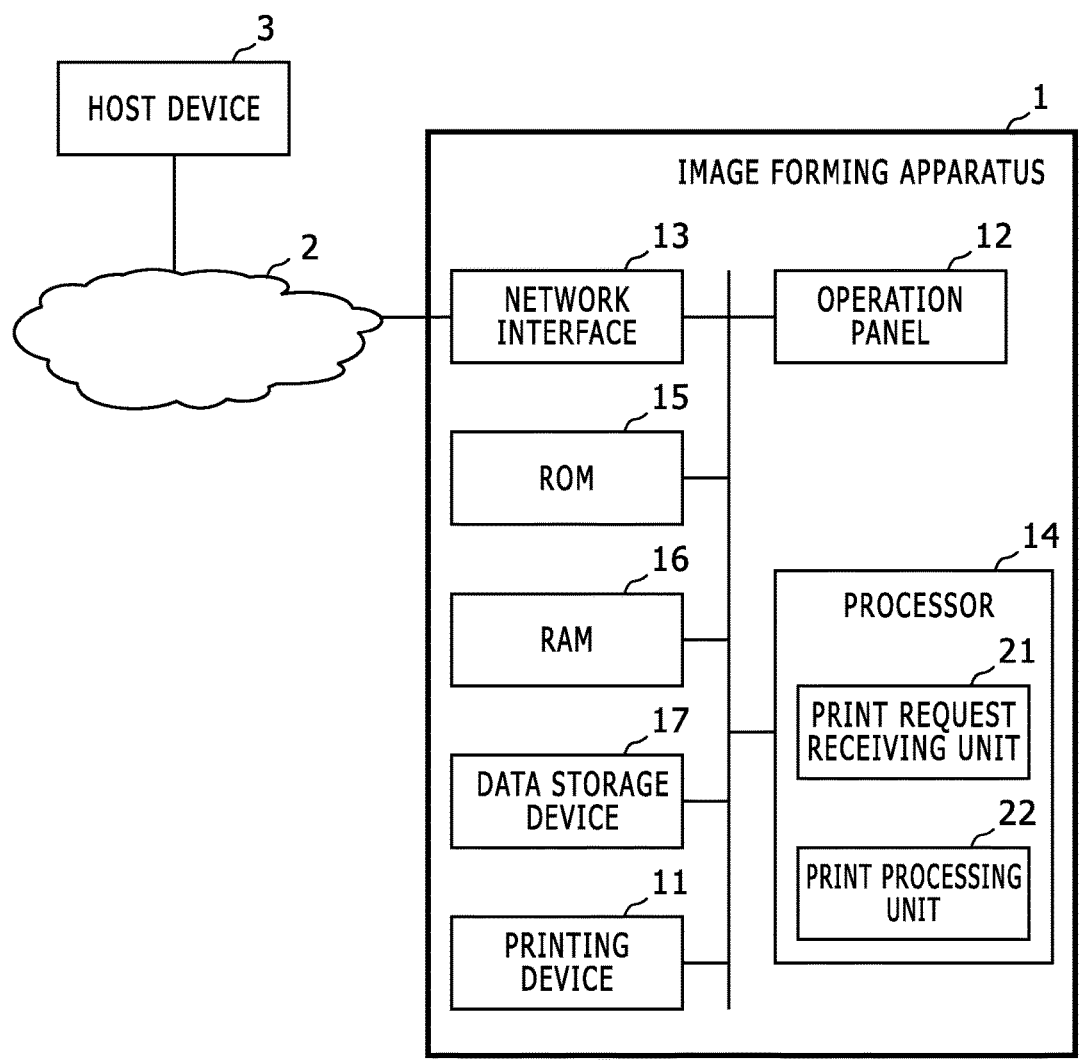
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure.

The image forming apparatus 1 shown in FIG. 1 is connected to a network 2, and a host device 3 is also connected to the network 2. The image forming apparatus 1 shown in FIG. 1 is an image forming apparatus such as a printer or a multi function peripheral, and includes a printing device 11 that prints an image on a printing paper sheet. Further, the network 2 is a LAN (Local Area Network) and/or a WAN (Wide Area Network). The host device 3 transmits a print request to the image forming apparatus 1 through the network 2.

Further, the image forming apparatus 1 includes an operation panel 12 and a network interface 13. The operation display unit 12 includes an input device that detects a user operation and a display device that display sort of information to a user. The network interface 13 is connected to the network 2 and is a communication device capable of data communication with the host device 3 or the like.

Furthermore, the image forming apparatus 1 includes a processor 14 such as CPU (Central Processing Unit) as a computer, a ROM (Read Only Memory) 15 that is a non-volatile memory, a RAM 16 that is a volatile memory and the like, and a data storage device 17 that is an SSD or the like that has a large capacity but low read/write speeds in comparison with the RAM 16. Here, the data storage device 17 is a storage device using a NAND flash memory.

Further, here, the RAM 16 is a main memory device, and the data storage device 17 is an auxiliary storage device.

The processor 14 loads a program stored in the ROM 15, the data storage device 17 or the like to the RAM 16 and executes the program, and thereby acts as a print request receiving unit 21 and a print processing unit 22.

The print request receiving unit 21 (a) receives, using the network interface 13, from an external device such as the host device 3 a print request that includes the number of printing pages and print image data, (b) selects one of the RAM 16 and the data storage device 17 as a device to which the print image data is to be written on the basis of the number of printing pages, and (c) writes the print image data in the selected RAM 16 or data storage device 17. For example, in the print request, the number of printing pages is arranged more nearly to the top of the request than the print image data, and therefore the number of printing pages can be determined before receiving the printing image data.

Specifically, the print request receiving unit 21 selects the RAM 16 as a device to which the print image data is to be written if the number of printing pages is equal to or less than a predetermined threshold value, and selects the data storage device 17 as a device to which the print image data is to be written if the number of printing pages exceeds the predetermined threshold value.

After the print request receiving unit 21 selected the RAM 16 as a device to which the print image data is to be written, the print request receiving unit 21 tries to write the print image data to the RAM 16. If a free space of the RAM 16 is not sufficient to write the print image data, then the print request receiving unit 21 (a) changes to the data storage device 17 the device to which the print image data is to be written and (b) writes the printing image data to the data storage device 17.

The print request receiving unit 21 derives the aforementioned threshold value by dividing a current free space of the RAM 16 by a reference page data size. The reference page data size is a standard value of a data size of print image data per page and is adjusted as mentioned below.

Further, the print request receiving unit 21 increases the reference page data size every predetermined number of times a free space of the RAM 16 is not sufficient to write the print image data.

For example, the print request receiving unit 21 increases the reference page data size PSref on the basis of a ratio between the number of occurrence times Nmf the free space of the RAM 16 is not sufficient and the number of times N the print image data is written in the RAM 16 or the data storage device 17, in accordance with the following formula for example, and thereby updates the reference page data size PSref. It should be noted that the reference page data size PSref is set as an integer value.

$$PSref=PSref*(1+Nmf/N)$$

For example, if the number N of writing time of the print image data is 100, a free space of the RAM 16 is 100 MB, the reference page data size PSref is 10 MB, the number Nmf of occurrence times of insufficient free space of the RAM 16 in a period until the number of writing times of the print image data is counted as N (here, N=100) is 10, then the reference page data size PSref is updated with 11 MB (=10+(1+10/100)), and the threshold value of the number of printing pages is changed from 10 pages to 9 pages (=100 MB/11 MB).

Further, if the number of writing times of the data storage device 17 in the predetermined period exceeds a predetermined value (the reference number Nwref of writing times), then the print request receiving unit 21 decreases the reference page data size.

Specifically, every predetermined period, the print request receiving unit 21 decreases the reference page data size on the basis of a ratio between the reference number Nwref of writing times in the predetermined period based on the lift time endurance writing times of the data storage device 17 and the number Nws of writing times of the data storage device 17 in the predetermined period, in accordance with the following formula, and thereby updates the reference page data size PSref.

$$PSref=PSref*Nwref/Nws$$

Here, for example, the reference number Nwref of writing times is obtained by multiplying a known life time endurance writing times NwL by a ratio (T/TwL) between the length T of the aforementioned predetermined period and a known life time endurance time TwL.

For example, if a free space of the RAM 16 is 100 MB, the reference page data size PSref is 10 MB, the reference number Nwref of writing times is 10,000, the number Nws of writing times of the data storage device 17 is 20,000, then the reference page data size PSref is updated with 5 MB (=10*(10,000/20,000)), and the threshold value of the number of printing pages is changed from 10 pages to 20 pages (=100 MB/5 MB).

The print request receiving unit 21 may select the RAM as a device to which the print image data is to be written, regardless of the number of printing pages, if the number of writing times of the data storage device 17 (the number of writing times in the whole period) exceeds the number of a life time endurance writing times of the data storage device 17.

Further, the print processing unit 22 reads the print image data from the RAM 16 or the data storage device 17 and performs a print process based on the print image data.

This image forming apparatus 1 is capable of multiple copy printing that performs printing of plural copies. In addition, this image forming apparatus 1 has an electronic sort function. Therefore when printing N copies of a document as a series of plural pages, each page is not printed continuously N times, and the whole document is printed repeatedly N times. In case of multiple copy printing, the print processing unit 22 reads the print image data from the selected RAM 16 or data storage device 17, and using the read print image data, performs printing the second copy and one or more subsequent copies.

In addition, the print processing unit 22 performs image processing such as color conversion, screen process and the like for the print image data, and controls printing device 11 and thereby performs printing based on the image-processed print image data using the printing device 11.

Figure 2:
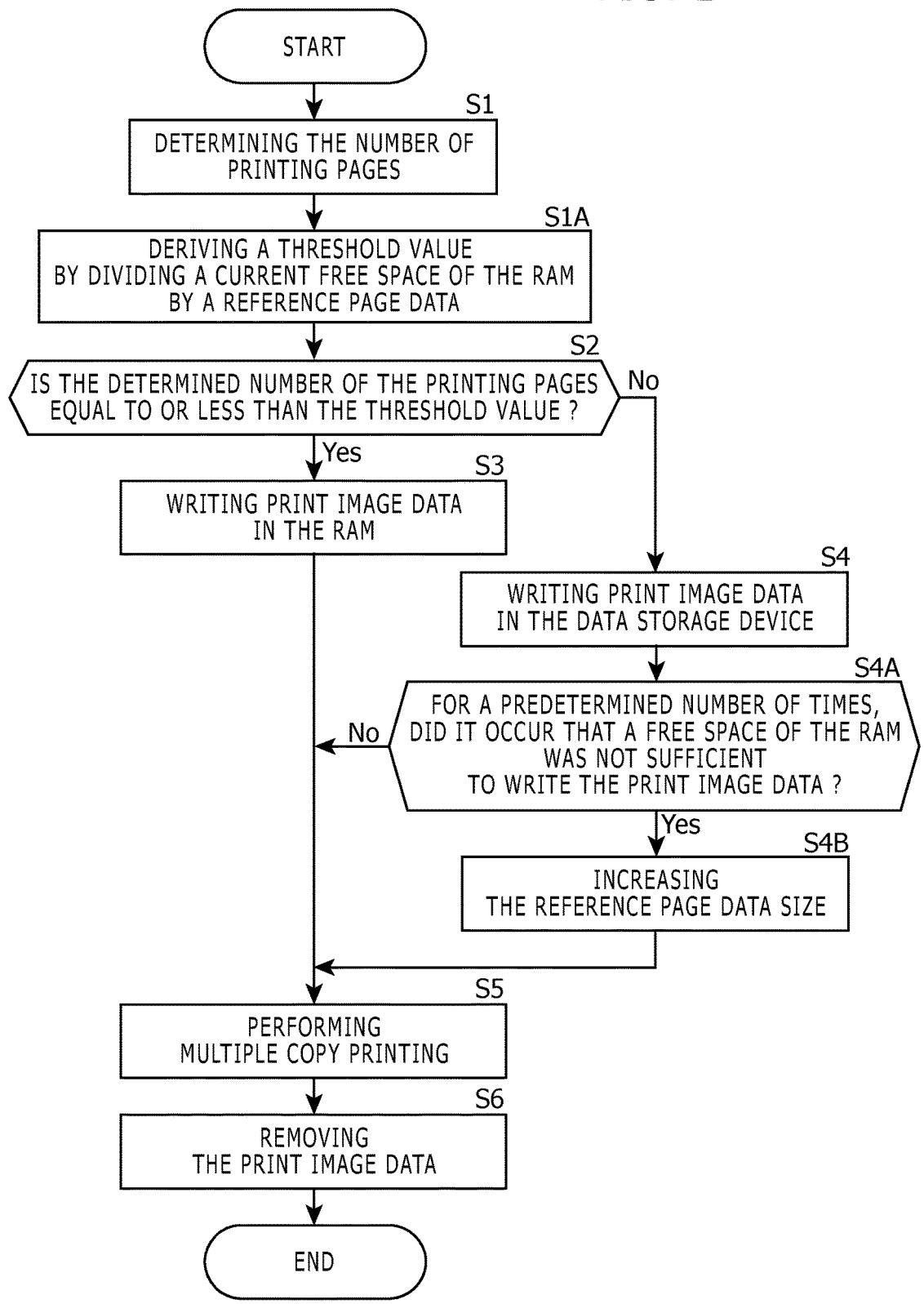
FIG. 2 shows a flowchart that explains a behavior of the image forming apparatus 1 shown in FIG. 1.

The following part explains a behavior of the aforementioned image forming apparatus 1. FIG. 2 shows a flowchart that explains a behavior of the image forming apparatus 1 shown in FIG. 1.

After starting receiving a print request of multiple copy printing, the print request receiving unit 21 determines the number of printing pages immediately when receiving the number of printing pages in the print request (in Step S1).

Upon determining the number of printing pages, the print request receiving unit 21 immediately determines whether or not the determined number of printing pages is equal to or less than a predetermined threshold value (in Step S2). The print request receiving unit 21 derives the aforementioned threshold value by dividing a current free space of the RAM 16 by a reference page data size (in Step S1A).

If the determined number of printing pages is equal to or less than a predetermined threshold value, then the print request receiving unit 21 writes the print request (including print image data) in the RAM 16 (in Step S3).

Contrarily, if the determined number of printing pages is not equal to nor less than a predetermined threshold value, then the print request receiving unit 21 writes the print request (including print image data) in the data storage device 17 (in Step S4). The print request receiving unit 21 increases the reference page data size if a free space of the RAM 16 is not sufficient to write the print image data for a predetermined number of times (in Steps S4A and S4B).

Afterward, as required, the print processing unit 22 reads the print image data written in the RAM 16 or the data storage device 17, and using the printing device 11, performs multiple copy printing based on the print image data (in Step S5).

After finishing the multiple copy printing, the print processing unit 22 removes the print image data in the RAM 16 or the data storage device 17 (in Step S6).

In the aforementioned embodiment, the print request receiving unit 21 (a) receives from an external device a print request that includes the number of printing pages and print image data, (b) selects one of the RAM 16 and the data storage device 17 as a device to which the print image data is to be written on the basis of the number of printing pages, and (c) writes the print image data in the selected RAM 16 or data storage device 17. The print processing unit 22 reads the print image data from the RAM 16 or the data storage device 17 and performs a print process based on the print image data.

Consequently, as a device to which print image data received from an external device is to be stored, one of the RAM 16 and the data storage device 17 such as SSD is properly selected. Therefore, in the print process, delay due to read/write of the print image data is restrained, and if the data storage device 17 is an SSD, the SSD gets a long life time.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a main memory device;
   an auxiliary storage device;
   a processor;
   a print request receiving unit, running on the processor, configured to (a) receive from an external device a print request that includes the number of printing pages and print image data, (b) select one of the main memory device and the auxiliary storage device as a device to which the print image data is to be written on the basis of a number of printing pages, and (c) write the print image data in the selected main memory device or auxiliary storage device; and
   a print processing unit, running on the processor, configured to read the print image data from the main memory device or the auxiliary storage device and perform a print process based on the print image data; wherein
   the print request receiving unit selects the main memory device as a device to which the print image data is to be written if the number of printing pages is equal to or less than a predetermined threshold value, and selects the auxiliary storage device as a device to which the print image data is to be written if the number of printing pages exceeds the predetermined threshold value; and
   the print request receiving unit derives the threshold value by dividing a current free space of the main memory device by a reference page data size.

2. The image forming apparatus according to claim 1, wherein when the main memory device is selected as a device to which the print image data is to be written, if a free space of the main memory device is not sufficient to write the print image data, then the print request receiving unit (a) changes to the auxiliary storage device the device to which the print image data is to be written and (b) increases the reference page data size every predetermined number of times a free space of the main memory device is not sufficient to write the print image data.

3. The image forming apparatus according to claim 2, wherein the print request receiving unit increases the reference page data size on the basis of a ratio between the number of occurrence times the free space of the main memory device is not sufficient and the number of times the print image data is written in the main memory device or the auxiliary storage device.

4. The image forming apparatus according to claim 1, wherein
   the auxiliary storage device is a storage device using a NAND flash memory; and
   the print request receiving unit reduces the reference page data size if the number of writing times of the auxiliary storage device in a predetermined period exceeds a predetermined value.

5. The image forming apparatus according to claim 4, wherein the print request receiving unit reduces the reference page data size on the basis of a ratio between the number of a reference writing times in the predetermined period based on the number of a life time endurance writing times of the auxiliary storage device and the number of writing times of the auxiliary storage device in the predetermined period.

6. The image forming apparatus according to claim 4, wherein the print request receiving unit selects the main memory device as a device to which the print image data is to be written, regardless of the number of printing pages, if the number of writing times of the auxiliary storage device exceeds the number of a life time endurance writing times of the auxiliary storage device.

* * * * *